United States Patent [19]

Brown et al.

[11] 4,128,112
[45] Dec. 5, 1978

[54] SPOOL VALVE FOR HYDRAULIC BRAKE BOOSTER

[75] Inventors: Arthur K. Brown, South Bend; Dean E. Runkle, La Porte, both of Ind.

[73] Assignee: The Bendix Corporation, Southfield, Mich.

[21] Appl. No.: 715,801

[22] Filed: Aug. 19, 1976

[51] Int. Cl.² .................... F16K 1/32; B60T 13/12
[52] U.S. Cl. .................................. 137/544; 60/548; 91/508; 137/625.48
[58] Field of Search ............... 137/244, 625.48, 544; 60/547, 548, 593; 91/412, 413

[56] References Cited

U.S. PATENT DOCUMENTS

| | | | |
|---|---|---|---|
| 1,378,586 | 5/1921 | Donnelly | 137/244 |
| 1,801,959 | 4/1931 | Hopkins | 137/244 |
| 3,521,853 | 7/1970 | Gilis, Jr. | 251/210 |
| 3,527,244 | 9/1970 | Stockman | 137/244 |
| 3,719,044 | 3/1973 | Bach | 60/547 |
| 3,877,227 | 4/1975 | Demido | 60/548 |

Primary Examiner—Martin P. Schwadron
Assistant Examiner—Abraham Hershkovitz
Attorney, Agent, or Firm—Paul David Schoenle; Ken C. Decker

[57] ABSTRACT

A hydraulic brake booster includes a spool valve within a housing for communicating fluid pressure into a chamber for urging a piston in a direction actuating a master cylinder, thereby effecting a brake application. The communication between an inlet passage and the chamber is regulated by a land on the spool valve cooperating with a corresponding land on the housing. In order to prevent particles which are carried in the pressurized fluid from wedging in the interface between the land and the corresponding housing land, an additional land is provided on the spool valve. The additional land cooperates with another land on the housing to form a small clearance therebetween so that large particles in the fluid are prevented from wedging in the interface between the sensitive land and the corresponding land on the housing when the valve is in the brake-released position.

1 Claim, 3 Drawing Figures

SPOOL VALVE FOR HYDRAULIC BRAKE BOOSTER

BACKGROUND OF THE INVENTION

In a hydraulic brake booster, a spool valve, slidably mounted in a housing, is biased to a brake-released position. A land on the spool valve cooperates with a corresponding land on the housing to substantially seal an inlet from a pressure chamber so that pressurized fluid is communicated to a steering gear. Since the land is contoured to regulate communication from the inlet to the pressure chamber as the spool valve moves away from the brake-released position, the land cannot readily be sealed for preventing seepage from the inlet to an exhaust passage or to the pressure chamber. Consequently, seepage past the land carries particles carried by the fluid into contact with the land. As the land is in close sliding engagement with a corresponding land on the housing, large particles carried by the seepage tend to wedge themselves between the lands so that upon operator actuation of the spool valve, the spool valve tends to stick to the housing to inhibit normal operation of the valve, when the fluid is overly contaminated.

SUMMARY OF THE INVENTION

The present invention provides a hydraulic brake booster in which a spool valve, slidably mounted in a housing, cooperates with the housing, to obviate the problem mentioned above. The spool valve and housing are provided with an additional land and groove, respectively, so that in the brake-released position the additional land cooperates with the housing to form a small clearance therebetween so that only those particles which are small enough to pass through this clearance are brought into contact with the land that regulates the communication from the inlet to the pressure chamber when the spool valve in in the brake released position. Moveover, as the spool valve moves to a brake actuating position, the additional land aligns with the additional groove on the housing to permit communication from the inlet to the land for regulating the flow to the pressure chamber.

DETAILED DESCRIPTION

Figure 1:
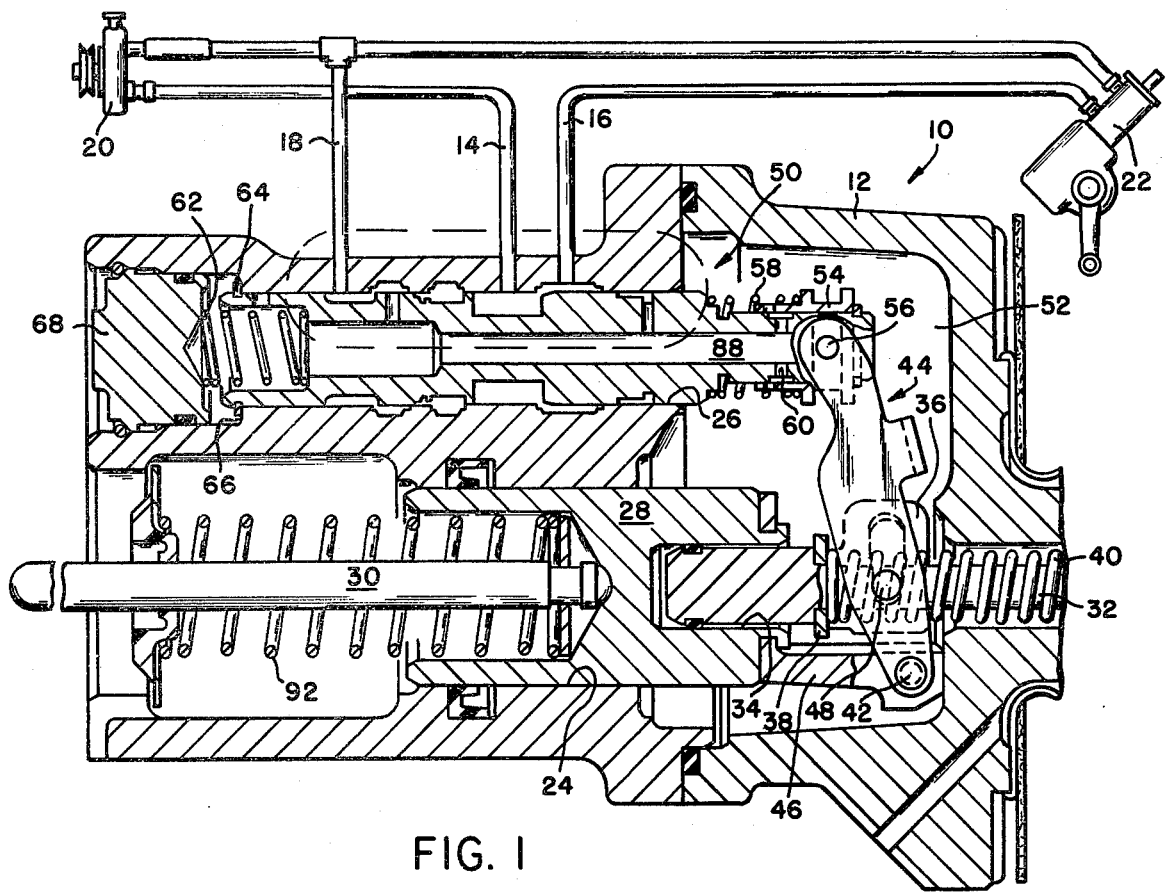
FIG. 1 is a schematic illustration of a vehicle hydraulic system with a brake booster according to the present invention in cross section.

Referring now to the drawings, the brake booster generally indicated by the numeral 10 includes a housing 12 having an inlet port 14, an outlet port 16, and a return or exhaust port 18. The inlet port 14 is communicated to the outlet or high pressure side of the vehicle power steering pump 20, and the outlet port 16 is communicated to the inlet of the vehicle power steering gear 22. The exhaust port 18 and the outlet of the gear 22 are each connected to a reservoir (not shown) at the inlet or low pressure side of the pump 20.

The housing 12 defines first and second bores 24 and 26 therewithin. A piston 28 is slidably mounted in the bore 24 and is provided with a connecting rod 30 which transmits movement of the piston 28 to a conventional automotive master cylinder (not shown) which is mounted just to the left of the housing 12, viewing FIG. 1. Of course, movement of the piston 28 to the left generates pressure in the aforementioned master cylinder in the conventional manner. One end of another rod 32 is slidably received in a blind bore 34 in the piston 28, and the opposite end of the rod 32 is connected to a conventional brake pedal (not shown) mounted in the vehicle operator's compartment. A bracket 36 is slidably mounted on the rod 32 and is urged into engagement with a stop ring 38 by a spring 40. A first pivot 42 connects one end of lever means 44 to a bracket 46 which is integral with the piston 28, and a second pivot 48 connects the intermediate portion of the lever means 44 with the bracket 36.

A spool valve generally indicated by the numeral 50 is slidably mounted in the bore 26 and is adapted to control fluid communication into the booster pressure chamber 52. A secondary valve 54 is slidably mounted on the end of the spool valve 50 extending into the pressure chamber 52, and a third pivot 56 connects the lever means 44 with the secondary valve 54. A spring 58 yieldably urges the secondary valve 54 away from openings 60 in the body of the spool valve 50. Another spring 62 yieldably urges the spool valve 50 into a first or brake-released position defined by the engagement of a stop 64 carried on the spool valve 50 with a shoulder 66 provided on the wall of the bore 26. The second or brake fully applied position of the spool valve 50 is defined by the engagement of the left hand end of the spool valve 50 with a plug 68 which closes the bore 26.

Figure 2:
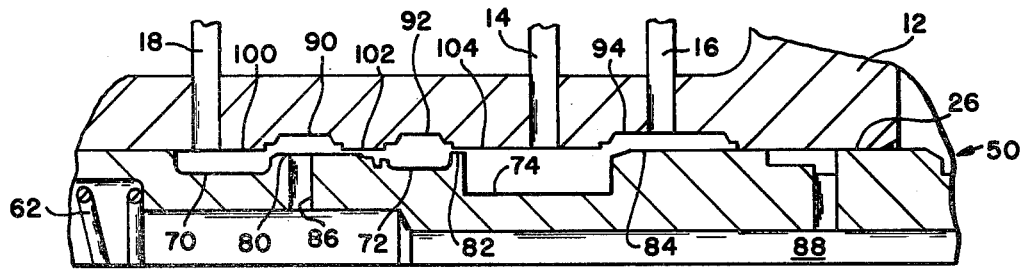
FIG. 2 is an enlarged, fragmentary cross-sectional view of the circumscribed portion of FIG. 1.

The spool valve 50, viewing FIG. 2, is provided with grooves 70, 72 and 74 and lands 80, 82 and 84, while housing 12 is provided with grooves 90, 92 and 94 and lands 100, 102 and 104. In the brake-released position illustrated in FIG. 2, pressurized fluid from the pump 20 is communicated to steering gear 22 via inlet port 14, groove 74, groove 94 and outlet port 16. Groove 70 is communicated to groove 90 for venting chamber 52 to the exhaust port 18 via opening 60, passage 88, opening 86 and grooves 70 and 90.

MODE OF OPERATION

With the spool valve 50 shifted to the right in the brake-released position, viewing FIG. 2, lands 80 and 82 on the spool valve 50 cooperate, respectively, with lands 102 and 104 on the housing 12 to substantially seal the exhaust port 18 and opening 86 from the inlet port 14, and land 84 on the spool valve is spaced from housing land 104 to communicate the inlet port 14 with the outlet 16. In addition, the chamber 52 communicates with the exhaust port 18 by means of passage 88 and opening 86. As the spool valve is shifted to the left upon brake application by the operator, land 82 registers with groove 92 and land 80 separates from land 102 to open communication between the inlet port 14 and pressure chamber 52. In addition, land 84 cooperates with land 104 to restrict communication to outlet port 16, and land 80 slidingly engages land 100 to close exhaust port 18. Therefore, pressurized fluid is communicated to the pressure chamber 52 for actuating piston 28.

Land 80 regulates the fluid communication between the inlet port 14 and chamber 52 when the spool valve is moving to the left in a braking application. The contour of the radially outer surface provides for regulating fluid flow such that noise is minimized and the spool valve is maintained in a stable condition. In contrast thereto land 82 includes a radially outer surface that is parallel to or concentric with the radially inner surface of land 104 so that the clearance therebetween will not permit the wedging of particles immersed in the seepage between these lands. Also, land 82 forms a smaller clearance with land 104 than land 80 forms with land 102, so that small particles in the seepage communicating between land 82 and 104 will easily communicate between land 80 and land 102.

Figure 3:
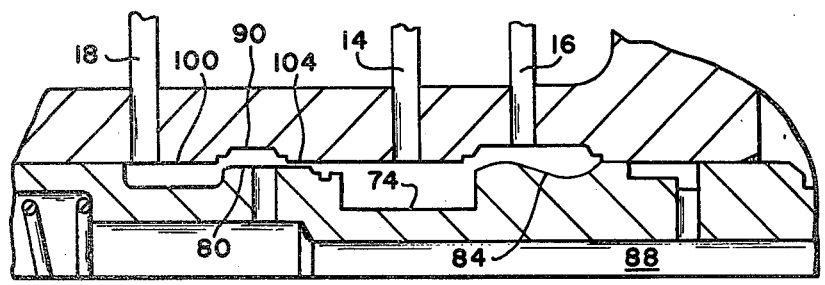
FIG. 3 is a fragmentary view similar to FIG. 2, but illustrating the prior art arrangement.

By viewing the operation of the prior art spool valve depicted in FIG. 3, it will be clearly understood how the present invention operates to overcome problems in the prior art.

As shown in FIG. 3, a spool valve in the brake-released position communicates inlet port 14 with outlet port 16 by engaging a land 80 with housing land 104. In this position, pressurized fluid in the groove 74 seeps through the small clearance between land 80 and land 104 so that particles carried in the fluid tend to wedge between these lands. Although the wedging of the particles between lands 80 and 104 when the valve is disposed in the brake-released position does not alter or deter steering operation, critical operation of the booster during a brake application can be affected. If a sufficient number of small particles or a single large particle wedges between lands 80 and 104, it is possible for the spool valve to become sticky and in extreme cases to lock or wedge itself against movement relative to the housing. Therefore, upon brake application, no pressurized fluid from the pump is provided to actuate the master cylinder because inlet port 14 cannot communicate with pressure chamber 52 unless spool valve 50 moves to separate lands 80 and 104. Under this extreme condition a power reserve system not shown will provide the power assist to stop the vehicle.

Turning to the hydraulic brake booster of the present invention as depicted in FIGS. 1 and 2, pressurized fluid is communicated to the pressure chamber 52 and the steering gear 22 in a manner which is well known in the prior art. However, the additional land 82 on the spool valve 50 and the additional groove 92 on the housing bore 26 are provided for preventing the buildup of particles at the interface between land 80 and land 102 when the valve 50 is disposed in the brake-released position and for permitting normal fluid communication between inlet 14 and pressure chamber 52 when the valve is disposed in a brake-applied condition.

Pressurized fluid within groove 74 seeps through the clearance between lands 82, 104, 80 and 102 when the spool valve is in the brakereleased position. However, before the pressurized fluid can enter the interface between land 80 and land 102, it must pass through the clearance between lands 82 and 104. With land 82 in sliding engagement with land 104, only small particles pass through to contact land 80. Moveover, with the clearance between lands 82 and 104 being smaller than the clearance between lands 80 and 102, the particles passing between lands 82 and 104 easily pass between lands 80 and 102. Therefore, large particles are filtered out at the interface between lands 82 and 104 to prevent sticking of the spool valve because of particles wedging between lands 80 and 102.

In the second or brake application position, the lands 80 and 82 are spaced from their cooperating housing lands 102 and 104, so that pressurized fluid from the inlet port communicates with the pressure chamber. Particles immersed in the fluid easily pass between the lands 82, 104, 80 and 102 in view of the spacing therebetween. Consequently, the possibility that particles will wedge between the land 80 and the corresponding housing land 102 is minimal when the valve is disposed in a brake application position.

It is understood that the invention as defined by the drawings and specification is a preferred embodiment and that various changes and modifications are possible by one of ordinary skill in the art without departing from the scope of the invention as measured by the following claims.

We claim:

1. In a hydraulic brake booster having a housing defining a pressure chamber and a bore for axially receiving a spool valve, the spool valve including a regulating land which cooperates with a first land on the housing bore to restrict fluid communication between an inlet port and the pressure chamber when the spool valve is in a first position and to control fluid communication between the inlet port and the pressure chamber when the spool valve is moved to a second position, the regulating land having a contoured surface to accomodate fluid communication from the inlet port to the pressure chamber in the second position of the spool valve, the spool valve including a second land which cooperates with a second land on the housing bore to restrict fluid communication between the inlet port and an outlet port when the spool valve is moved to the second position, the second land on the housing bore also receiving the inlet port, the improvement in which the housing bore first and second lands are separated by a groove and the spool valve includes a third land, said third land being disposed axially between the spool valve regulating land and the spool valve second land and being separated from the spool valve regulating land and the spool valve second land by grooves, said spool valve third land cooperating with the housing bore second land when the spool valve is in the first position to form a clearance therebetween for restricting fluid communiction from the inlet port to the spool valve regulating land and for filtering out particles in the fluid communication, said spool valve third land cooperating with the groove between the housing bore first and second lands when the spool valve is in the second position to open communication from the inlet port to the spool valve regulating land, said spool valve regulating land being located downstream of said spool valve third land in both, said first and second positions of said spool valve.

* * * * *